United States Patent
Ma

(10) Patent No.: US 9,789,837 B2
(45) Date of Patent: Oct. 17, 2017

(54) AIRBAG BRACKET AND VEHICLE AIRBAG SYSTEM

(71) Applicant: FORD GLOBAL TECHNOLOGIES, LLC, Dearborn, MI (US)

(72) Inventor: Qingsong Ma, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/069,185

(22) Filed: Mar. 14, 2016

(65) Prior Publication Data

US 2016/0297391 A1 Oct. 13, 2016

(30) Foreign Application Priority Data

Apr. 7, 2015 (CN) .......................... 2015 1 0161149

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01)

(58) Field of Classification Search
CPC ..... B60R 21/18; B60R 21/213; B60R 21/214; B60R 21/232; B60R 21/2338; B60R 2021/0253; B60R 2021/23386; B60R 2022/1818; B60R 2022/1831
See application file for complete search history.

(56) References Cited

U.S. PATENT DOCUMENTS

| 6,279,941 B1 * | 8/2001 | Nakajima ............ B60R 21/213 280/728.2 |
| 6,705,635 B2 * | 3/2004 | Hoeft ...................... B60R 21/20 280/728.2 |
| 6,851,702 B2 * | 2/2005 | Henderson ............ B60R 21/213 280/728.2 |
| 7,040,647 B2 * | 5/2006 | Deligny ................ B60R 21/232 24/293 |
| 7,100,939 B2 * | 9/2006 | Blake, III ............. B60R 21/232 280/728.2 |
| 7,192,057 B2 * | 3/2007 | Moendel ................. B60R 22/18 280/801.1 |
| 7,201,400 B2 * | 4/2007 | Hattori .................... B60R 22/24 280/801.1 |
| 7,210,886 B2 * | 5/2007 | Kawai ................... B60R 21/213 411/182 |

(Continued)

FOREIGN PATENT DOCUMENTS

| JP | 2014184792 A | * 10/2014 |
| JP | 2014189039 A | * 10/2014 |

(Continued)

*Primary Examiner* — Laura Freedman
(74) *Attorney, Agent, or Firm* — Vichit Chea; MacMillan, Sobanski & Todd, LLC

(57) ABSTRACT

An airbag bracket includes a self-fastening protrusion extending from a plate-like metallic base. The base includes a tongue onto which the protrusion is molded using a polymeric material. The base has at least one through-aperture onto which a fabric tail of an airbag unit may be wound. The base further includes a fastener aperture to receive there-through a fastener. The protrusion and fastener are mounted in respective holes or sockets in a body wall of a vehicle in order to mount the airbag system.

13 Claims, 4 Drawing Sheets

(56) References Cited

U.S. PATENT DOCUMENTS

| | | | | |
|---|---|---|---|---|
| 7,216,891 B2 * | 5/2007 | Biglino | ................. | B60R 21/232 24/293 |
| 7,401,815 B2 * | 7/2008 | Clute | ................. | B60R 22/4619 180/268 |
| 7,523,958 B2 * | 4/2009 | Jang | ................. | B60R 21/213 24/289 |
| 7,578,525 B2 * | 8/2009 | You | ................. | B60R 22/24 280/801.1 |
| 7,731,236 B2 * | 6/2010 | Richter | ................. | B60R 22/18 280/801.1 |
| 7,837,225 B2 * | 11/2010 | Gosis | ................. | B25B 31/00 24/297 |
| 7,874,579 B2 | 1/2011 | Yokota et al. | | |
| 7,905,511 B2 | 3/2011 | Okimoto | | |
| 8,434,782 B2 * | 5/2013 | Asano | ................. | B60R 21/213 280/728.2 |
| 8,573,638 B2 | 11/2013 | Hayashi et al. | | |
| 8,960,716 B2 | 2/2015 | Takeuchi | | |
| 2005/0011057 A1 * | 1/2005 | Dominssini | ........... | B60R 21/233 24/570 |
| 2005/0046154 A1 | 3/2005 | Rhea et al. | | |
| 2006/0237950 A1 * | 10/2006 | Worrell | ................. | B60R 21/213 280/728.2 |
| 2007/0138783 A1 * | 6/2007 | Gleason | ................. | B60R 22/24 280/808 |
| 2010/0066060 A1 * | 3/2010 | Kalandek | ............. | B60R 21/213 280/728.2 |
| 2013/0240662 A1 * | 9/2013 | Ito | ........................ | B60R 22/24 242/615.3 |
| 2014/0062115 A1 * | 3/2014 | Tuomisto | ............ | B60R 22/24 296/1.08 |
| 2015/0251626 A1 * | 9/2015 | Board | ................... | B60R 21/18 280/801.1 |
| 2016/0121845 A1 * | 5/2016 | Lee | ........................ | B60R 22/24 280/733 |

FOREIGN PATENT DOCUMENTS

| | | | | |
|---|---|---|---|---|
| JP | | 2014218117 A | * 11/2014 | |
| SE | WO | 2014181971 A1 | * 11/2014 | ............. B60R 21/18 |

* cited by examiner

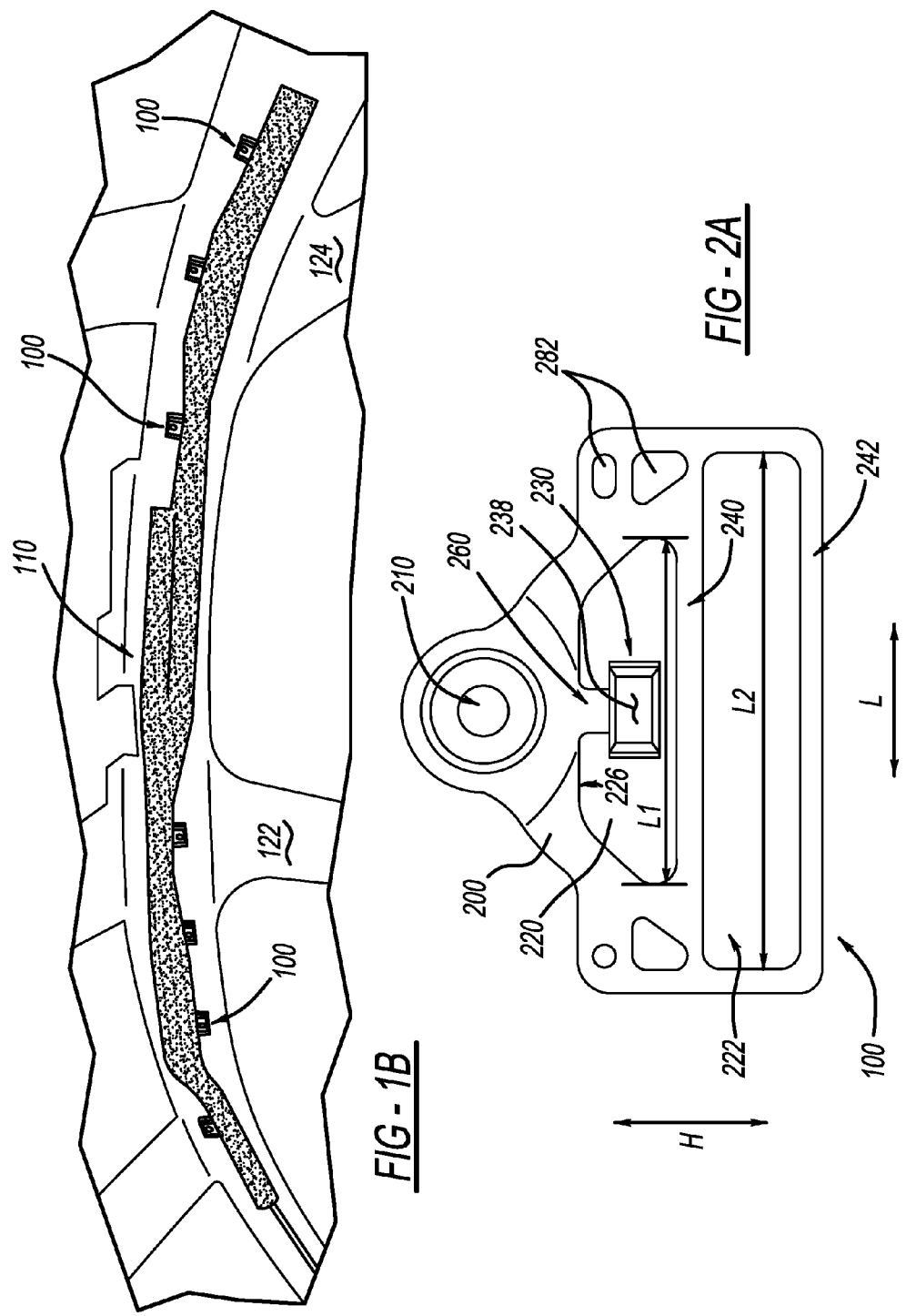

AIRBAG BRACKET AND VEHICLE AIRBAG SYSTEM

CROSS REFERENCE TO RELATED APPLICATIONS

This application claims the benefit of Chinese Patent Application No. CN201510161149.2, filed Apr. 7, 2015, the entire contents thereof being incorporated herein by reference.

TECHNICAL FIELD

The present invention relates to an airbag bracket and a vehicle airbag system including the same.

BACKGROUND OF THE INVENTION

With increased attention for vehicle safety, enhanced safety measures such as side curtain airbags are equipped in certain vehicles, where such curtain airbags may be installed to vehicles through brackets.

In one example, US2005/0046154A1 discloses a mounting bracket that may be used to mount an inflatable curtain airbag, where the mounting bracket includes a base bracket and a retaining clip attachable to the base bracket.

SUMMARY OF THE INVENTION

In order to provide a robust mounting attachment and to protect against bracket rotation, the anchoring of an airbag bracket may preferably include two independent anchor points between the bracket and the underlying panel to which the bracket is attached. In addition, it is desirable for ease of installation for one of the anchor points to provide a self-fastening function so that a person performing the assembly operation is able to provide an initial placement and attachment of an airbag assembly (e.g., a side curtain airbag with brackets attached to it) to a vehicle wall (e.g., a roof panel) by simply aligning the assembly and pressing it in place, so that self-fastening pins extending from the brackets are captured in corresponding receptacles (e.g., holes) in the vehicle wall. Use of a self-fastening pin further enables the location of one of the anchor points to be behind (covered by) the main body of the airbag unit. After initial placement and engagement of the self-fastening pins, the assembler's hands are free to insert an additional fastener at each of the second anchor points of each bracket.

In one or more embodiments of the invention, an airbag bracket includes a base including a fastener aperture to receive there-through a fastener and including a first material, and a protrusion supported on the base and including a second material different from the first material. The first material may include a metallic material and the second material may include a polymeric material. The base may include a tongue to be at least partially received within the protrusion. The base may define first and second through-apertures spaced apart from each other, the tongue extending from an edge of the first through-aperture. The second through-aperture may be longer in a width dimension than the first through-aperture. The first through-aperture may be positioned between the fastener aperture and the second through-aperture. The through-apertures provide a structure onto which the main body of the airbag unit may be attached (e.g., by a fabric tail of side curtain airbag being wound onto the base by threading and winding over the aperture(s)).

The protrusion may provide a self-fastening pin function, and may include a first segment with a first cross-section and a second segment with a second cross-section positioned between the base and the first segment. The first cross-section is different from the second cross-section in at least one of circumferential shape or perimeter dimension. The protrusion may include on its outer surface two or more ribs spaced apart from each other. The protrusion may include a transverse bar separating first and second cavities.

The base may include a stepped area surrounding the fastener aperture. The fastener aperture is positioned in a first step, which is surrounded by a second step. When at an assembled position, the second step contacts a sidewall of the vehicle and the first stepping area is spaced apart from the sidewall of the vehicle.

The airbag bracket may further include one or more supplemental apertures.

In one or more embodiments, a vehicle airbag system includes an airbag unit together with an airbag bracket as detailed herein. The airbag bracket includes a base having a fastener aperture to receive there-through a fastener and including a first material, and a protrusion supported on the base and including a second material different from the first material. The base is connected to the airbag unit and the protrusion is to be engaged with a vehicle body portion. A flexible tail of the airbag may contact the protrusion. The flexible tail of the airbag may include an opening to receive there-through the protrusion such that the flexible tail of the airbag is between the bracket and an interior outer surface of the vehicle body portion in an assembled position. The flexible tail may also be wound over through-apertures in the base in addition to receiving the protrusion.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein:

FIG. 1B illustratively depicts an enlarged sectional view of the curtain airbag referenced in FIG. 1A;

FIG. 2A illustratively depicts a front view of the airbag bracket referenced in FIG. 1A and FIG. 1B;

DETAILED DESCRIPTION OF PREFERRED EMBODIMENTS

Figure 1A:
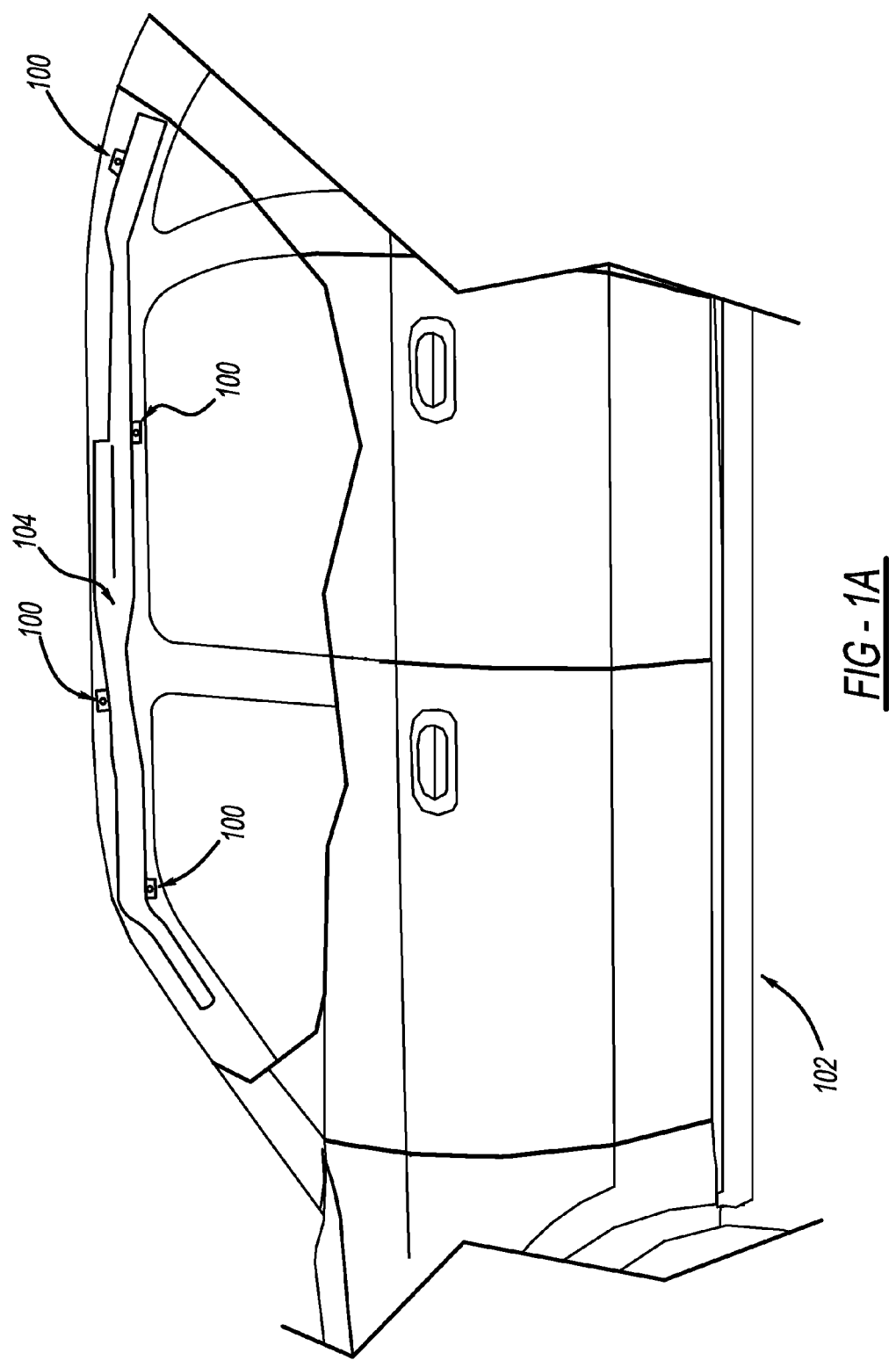
FIG. 1A illustratively depicts a perspective view of an airbag bracket for positioning a vehicle curtain airbag according to one or more embodiments of the present invention.

As referenced in the Figures, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

FIG. 1A illustratively depicts a non-limiting example location of an airbag bracket 100 as employed for positioning a vehicle curtain airbag 104 according to one or more embodiments of the present invention. Curtain airbag 104 may be positioned at an interior upper portion of a vehicle 102, where the curtain airbag 104 may be any suitable safety curtain airbag applicable in the vehicle 102, and the curtain airbag 104 is installed via one or more airbag brackets 100. In the event of a side impact, the certain airbag 104 may deploy to protect an occupant of the vehicle 102.

FIG. 1B illustratively depicts an enlarged sectional view of the curtain airbag 104 shown in FIG. 1A, wherein the curtain airbag 104 is generally located at the interior upper portion of a B-pillar 122 and a C-pillar 124 of the vehicle 102 and is connected to the vehicle 102 via one or more airbag brackets 100. After a deployment, the curtain airbag 104 may space the occupant apart from any nearby windows, B-pillar 122, and/or C-pillar 124 to protect the occupant from any resultant impact. The design of the airbag bracket 100 will be detailed herein.

Figure 2B:
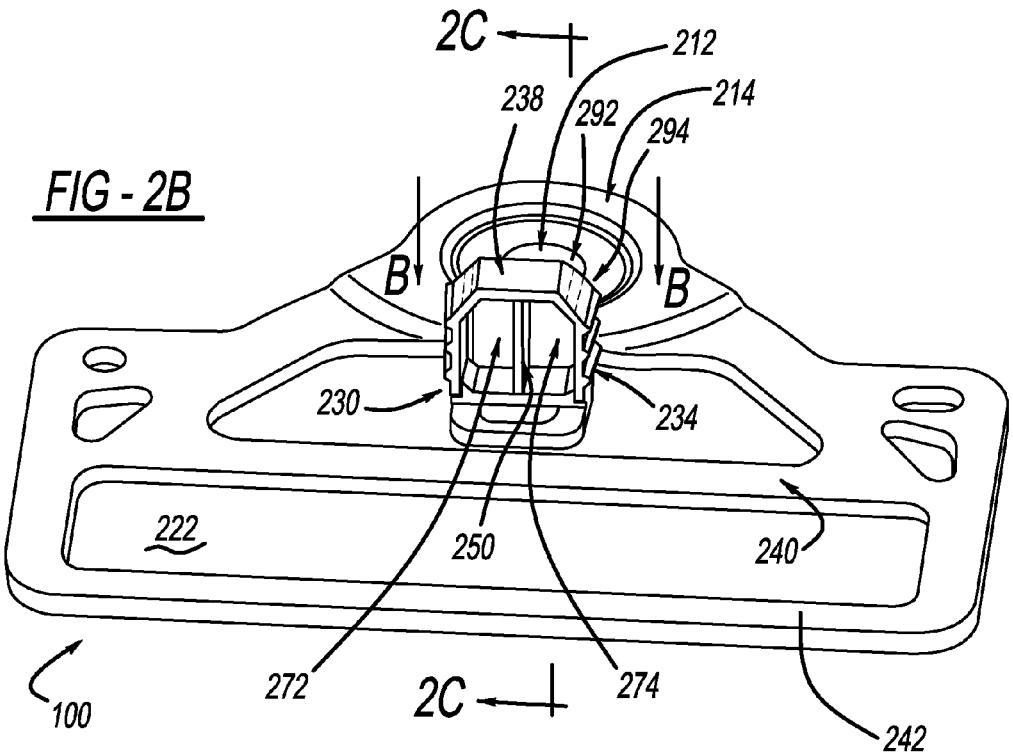
FIG. 2B illustratively depicts an enlarged perspective view of the airbag bracket referenced in FIG. 2A.
Figure 2C:
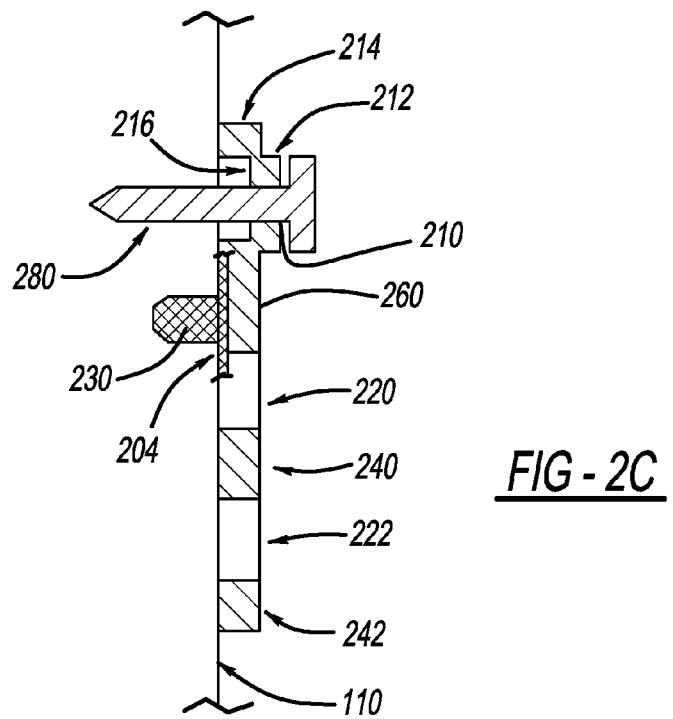
FIG. 2C illustratively depicts a cross-sectional view of the airbag bracket referenced in FIG. 2A in view of its assembled position relative to the curtain airbag.

Without wanting to be limited to any particular theory, and as detailed herein in view of FIG. 2A through FIG. 2C, it is believed that to securely attach the curtain airbag 104 onto the vehicle 102, and on a sidewall 110 thereof in particular, certain attachment strength is required between a base 200 and a protrusion 230 of the airbag bracket 100, which in turn places certain requirement on the material(s) for the airbag bracket 100. At the same time, a certain level of flexibility of protrusion 230 is needed to facilitate installation/assembly of curtain airbag 104 onto bracket 100 (e.g., to accommodate any misalignment between protrusion 230 and a receiving-hole in a body sheet metal panel to which bracket 100 is being mounted). Moreover, it is desirable that the curtain bracket 100 should facilitate a smooth deployment of the curtain airbag 104 without unnecessary damage to the curtain airbag 104. By providing the airbag bracket 100 with different structural and/or material features, the present invention in one or more embodiments provides enhanced solutions for curtain airbag attachment in a vehicle.

FIG. 2A together with FIG. 2B and FIG. 2C illustratively depict airbag bracket 100 of curtain airbag 104 in one or more embodiments. Airbag bracket 100 includes base 200 and protrusion 230 supported on base 200. Base 200 includes a fastener aperture 210 for receiving or connecting a fastener 280 so as for the base 200 to be attached to the side wall 110 of the vehicle 102. The fastener 280 may include but is not limited to one or more pins, screws, bolts, or rivets.

The present invention in one or more embodiments is advantageous in providing enhanced level of design and operation flexibility to the curtain bracket 100 by making the protrusion 230 materially independent from the base 200. In particular, the protrusion 230 may differ in material from the base 200. More particularly, the base 200 may include a material that is different from that of at least a portion of the protrusion 230. The base 200 may include a material of a material strength higher than that of the protrusion 230, or of a material with lower flexibility than that of the protrusion 230. Accordingly, the protrusion 230 may be formed relatively more flexible and compressible in comparison to the base 200 such that the protrusion 230 facilitates its insertion into a hole or socket in the sidewall 110, while the greater strength and relative rigidity of base 200 helps maintain the general shape and strength for supporting the curtain bag 104.

The base 200 may include a first material such as a metallic material while the protrusion 230 may include a second material such as a polymeric material which is different from the first material. Alternatively, the base 200 may be formed by non-metallic materials, such as carbon fiber enhanced polymeric material with good material strength. In a preferred embodiment, base 200 may comprise stainless steel and/or aluminum alloy, and protrusion 230 may include polyethylene, polypropylene, and/or polyvinyl chloride.

Referring back to FIG. 2A and FIG. 2B, base 200 includes a tongue 260 extending from an edge 226 of a first through-aperture 220, with protrusion 230 being supported on tongue 260. In one or more embodiments, the protrusion 230 is formed on the tongue 260 via molding (e.g., overmolding). Any suitable molding techniques may be used and are not reproduced herein for brevity. The tongue 260 provides and/or functions as a support for molding the protrusion 230 and may be of any suitable configurations and designs. For instance, the tongue 260 may curve away from or be at an angle relative to the plane that defines base 200, and protrusion 230 may be formed onto the tongue 260 via injection molding. Moreover, tongue 260 may be a unitary and integral portion of the base 200 that is formed and defined during creation of the first through-aperture 220 via material removal. Moreover, tongue 260 may be readily configured in a manner that facilitates the injection molding process to form protrusion 230. Because tongue 260 may be integrally extending from the base 200 and because a portion of the tongue 260 may be received within the protrusion 230 via injection molding, the protrusion 230 achieves enhanced support and attachment strength.

In one or more embodiments, the tongue 260 and the protrusion 230 are generally positioned in or near a middle portion of the base 200. In some instances, the tongue 260 and the protrusion 230 together with the fastener aperture 210 are located at or near a central (vertical) axis of the base 200. As a result, the attachment or connection strength may be improved as force may be applied in an even manner. It should be appreciated that the tongue 260 and the protrusion 230 may be formed at other suitable locations within the vehicle 102 to function as an attachment locator for other types of curtain airbags.

Referring back to FIG. 2A and FIG. 2B, an end surface 238 of the protrusion 230 located further away from the base 200 has a perimeter dimension or profile different from that of an intervening cross-section of the protrusion 230. In particular, the end surface 238 of the protrusion 230 may have the smallest perimeter/profile than any other segment along protrusion 230. Accordingly, protrusion 230 be configured to provide tapered outer surfaces transitioning from a root portion where the protrusion 230 initially extends from the tongue 260 to the end surface 238. In another embodiments, the end surface 238 of the protrusion 230 is of a circumference or circumferential shape different from that other segments along protrusion 230.

For instance, the shape of the end surface 238 may be circular while the other cross-sections may be rectangular. For instance and as illustratively depicted in FIG. 2B, a first cross-section 292 of the protrusion 230 is positioned between the end surface 238 and a second cross-section 294 of the protrusion 230, wherein the first and second cross-sections 292, 294 may differ from each other in size, dimension, and/or shape. In particular, and as illustratively depicted in FIG. 2B, the first cross-section section 292 is smaller in its outer perimeter and/or its total profile area in comparison to the second cross-section 294.

Accordingly the end face 238 along with the cross-sections 292, 294 collectively define a sloped outside, the design of which is believed to make relatively easier to help the operator to locate a proper placement for inserting protrusion 230 into a corresponding hole in the vehicle wall. During installation, an operator may be able to locate where the attach with relatively enhanced ease and accuracy, and can readily achieve the required force to cause protrusion 230 to snap into the hole. Protrusion 230 may be of any suitable shapes, such as cylindrical, conical, cubical, or any combination thereof.

FIG. 2B illustratively depicts a perspective view of the airbag bracket 100 referenced in FIG. 2A, where the protrusion 230 of the airbag bracket 100 defines a void space in the middle (i.e., has a hollow configuration). The hollow configuration is believed to bring about enhanced structural flexibility (i.e., for snapping into the receiving hole) and greater tolerance for deformation during pre-attachment positioning of the airbag bracket 100 to the vehicle 102. Moreover, material cost as well as weight may accordingly be favorably reduced. Optionally, the void space of the protrusion 230 may be reduced in size or completely eliminated such that the protrusion 230 may be rendered relatively more solid and sturdy.

In one or more embodiments, the protrusion 230 may be formed as a hollow plastic member formed through injection molding. The hollow design may be more advantageous for the injection molding process wherein wall thickness as well as the general outer shape of the protrusion 230 may be under improved control and wherein issues with variable sizes and dimensions due to uneven shrinking associated with injection molding may be minimized.

The term "hollow plastic member" may refer to the existence of one or more cavities defined in a cross-section of the protrusion 230 taken along line B-B. For instance and as illustratively depicted in FIG. 2B, the protrusion 230 may include a transverse bar 250 positioned therein and the transverse bar 250 may vertically, horizontally or in any appropriate angle, extend across an interior cavity of protrusion 230, thereby separating two cavities 272, 274 so as to present the protrusion 230 as a hollow plastic member. The transverse bar 250 is believed to strengthen the protrusion 230 as a whole to reduce or prevent damages thereto during and/or after installation, while the existence of the cavities and its associated weight and cost benefits may be maintained.

Referring back to FIG. 2B, the protrusion 230 may include two or more spaced apart ribs 234 to provide better engagement for the attachment. The ribs 234 of the protrusion 230 may be of any suitable designs, such as in the form of one or more ribs, one or more protrusions, and ribs or protrusions with any shape or distribution. Ribs may be advantageously provided to guide an operator when the operator is pushing down the protrusion 230 during an installation operation. However, the outer surface of the protrusion 230 may be free of any textures such as ribs, lines, protrusions, or convex segments. In this configuration, the protrusion 230 may be simply be formed with one or more larger segments to ensure engagement into a relatively smaller aperture during installation.

In view of FIG. 2A, the base 200 of the airbag bracket 100 may further include the first through-aperture 220 and a second through-aperture 222 spaced from each other by a first bridge 240. The first and second through-apertures 220, 222 may each independently be formed via material removal via any suitable cutting, knifing, or punching techniques, for example. The first through-aperture 220 and second through-aperture 222 may each have the shape of a trapezoid, a square, a rectangular, an oblong, or any other symmetrical or asymmetrical shapes or regular or irregular shapes. In a non-limiting example, the first through-aperture 220 may be a trapezoid in shape, and the second through-aperture 222 may be a rectangular in shape. In this configuration, the airbag bracket 100 may be greatly reduced in weight and the attachment of the curtain airbag 104 to the vehicle 102 may be better stabilized.

In certain embodiments, as illustratively depicted in FIG. 2A, the second through-aperture 222 is defined by a second linear dimension L2 greater than a first linear dimension L1 of the first through-aperture 220 along a width direction L. Curtain airbag unit 104 may be connected to the first bridge 240 via fabrics and may be wrapped onto the airbag bracket 100 via fabrics. Accordingly the second through-aperture 222 is positioned to receive therethrough relatively more fabrics extending from the curtain air bag 104 and hence greater attachment stability.

In certain embodiments, and as illustratively depicted in FIG. 2A, the second through-aperture 222 includes a second bridge 242 opposite to the first bridge 240. The second bridge 242 is believed to be beneficial with its particular width and shape so as to accommodate and facilitate the attachment of the curtain airbag 104 into an elongated and rather narrow space in the interior upper portion of the vehicle 102 where the attachment is to occur.

In one or more embodiments, the base 200 of the airbag bracket 100 may further include one or more supplemental apertures 282. There does not need to be any no special restriction to the shape and distribution of the supplemental apertures 282, provided that the connection strength of the airbag bracket 100 may be ensured and the total assembly weight may reduced as much as possible. Along these configurations mentioned herein, other suitable alternative designs for the supplemental apertures 282 may be reasonable within the scope of the present invention in one or more embodiments.

Additionally, in one or more embodiments, the fastener aperture 210 of the base 200 may adopt a stepwise design. For instance, and as illustratively depicted in FIG. 2B in view of FIG. 2C, the fastener aperture 210 is defined by stepped areas 212, 214 of the base 200, which together define a cavity 216 facing side wall 110. The cavity 216 may be configured and/or sized to receive there-through a pre-formed boss or raised surface surrounding a receiving-hole (not shown) formed on the side wall 110. In this manner, the above mentioned stepwise design of the fastener aperture 210 may engage a convex boss portion on the vehicle body such that the base 200 of the airbag bracket 100 may closely engage the body of the vehicle 102, which as a result is to increase the contact area and the connection strength therebetween.

The protrusion 230 may be configured to extend from the plane that defines the base 200. For instance, the airbag bracket 100 has generally a flat sheet shape, with a circumference to thickness ratio of the base 200 being greater than 2:1, or 10:1.

Figure 3A:
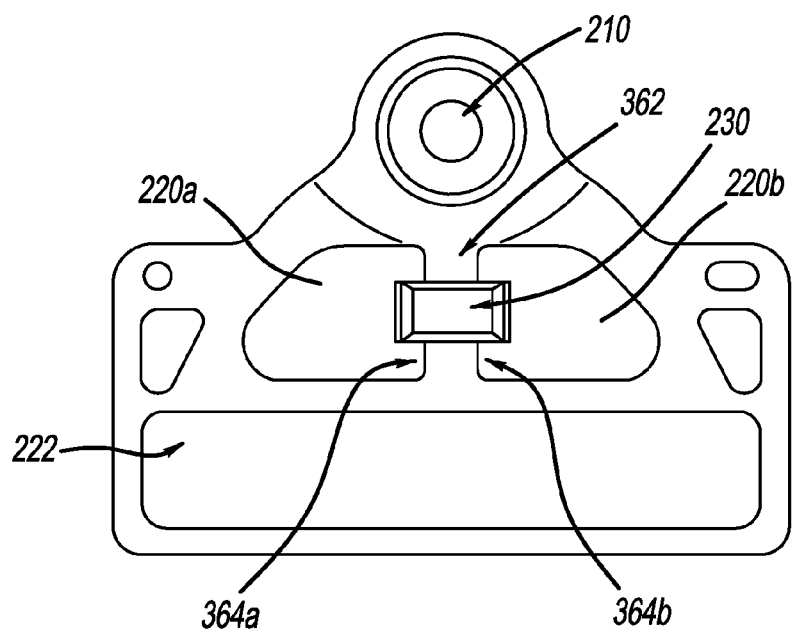
FIG. 3A illustratively depicts an alternative view of the airbag bracket referenced in FIG. 2A.
Figure 3B:
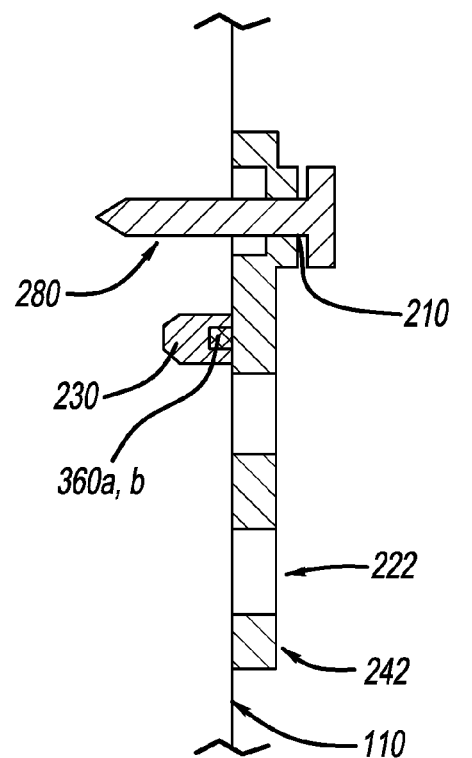
FIG. 3B illustratively depicts a cross-sectional view of the airbag bracket referenced in FIG. 3A.

In certain other embodiments, and as illustratively depicted in FIG. 3A and FIG. 3B, the first through-aperture 220 may be configured as two spaced-apart through-apertures 220a, 220b separated from each other via a third bridge 362 of the base 200. The third bridge 362 defines opposing edges 364a, 364b, upon which two opposing ribs 360a, 360b may be respectively located to support the protrusion 230. Similarly, the ribs 360a, 360b may be a unitary and integral extension from the third bridge 362 as a result of the formation of the through-apertures 220a, 220b via material removal.

Variable methods may be employed to install the airbag bracket 100. The curtain airbag 104 may be connected to the airbag bracket 100 via a flexible tail 204 extending from the curtain airbag 104 with non-limiting example of material thereof including a natural or synthetic fabric or polymer, wherein the flexible tail 204 may be sewn onto the first bridge 240 of the airbag bracket 100, and then wrapped onto the second bridge 242 of the airbag bracket 100. The remaining part of the flexible tail 204 after the wrapping may be returned onto the protrusion 230 via a hole defined on the flexible tail 204. Thereafter, the protrusion 230 is pushed into the vehicle body along with the flexible tail 204 of the curtain airbag 104. In this manner, the protrusion 230 not only functions to pre-position for the attachment, but also serves to facilitate the attachment of the airbag 104 without necessarily having to use other connectors or hooks otherwise required in certain existing designs.

With this design, the curtain airbag 104 may be beneficially devoid of issues in the prior art associated with excess use of metal hooks and other rigid connectors, and hence the attachment of the curtain airbag 104 is provided with less scratches and greater operational ease. The curtain airbag 104 may thus be pre-positioned at its predetermined locations with various airbag brackets 100, and such an assembly may then readily be installed onto the interior upper portion of the vehicle 102 in an optionally one-step procedure. Specifically, the operator may push the protrusion 230 of the airbag bracket 100 into a receiving portion on the vehicle 102 to realize both the positioning and the attachment. Subsequently, the attachment may be finalized and secured by applying one or more fasteners such as bolts or pins into the fastener aperture of the airbag bracket 100.

As mentioned herein elsewhere, the second bridge 242 helps secure and maintain the flexible connector on and around the bracket assembly 100 and hence the curtain airbag 104 onto the vehicle 102. More particularly, because of its particular width-to-height dimension or L/H ratio with relatively elongated presence along the direction "L", the second bridge 242 of the airbag bracket 100 is better positioned to maintain a predetermined width and shape of the airbag 104.

Referring back to FIG. 1A and FIG. 1B, the curtain airbag 104 may be attached onto a vehicle body via a number of airbag brackets 100. The distance between any two adjacent airbag brackets 100 may be no less than 2.5 centimeters (cm), 5 cm, 7.5 cm, or 10 cm, and no greater than 50 cm, 40 cm, 30 cm or 20 cm. In certain embodiments, the distance between any two adjacent airbag brackets 100 may be 15 cm to 20 cm to accommodate a need for a sturdy attachment and a need for fewest number of brackets possible. The total number of brackets 100 may suitably be varied dependent upon a particular airbag installation project at hand, while total assembly weight and cost may also be carried into consideration.

In one or more embodiments, the present invention as set forth herein is believed to have overcome certain challenges associated with vehicle curtain airbag attachment and installation. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An airbag bracket for mounting an airbag unit to a wall of a vehicle, comprising:
    a base including a fastener aperture to receive therethrough a fastener, wherein the base comprises a first material formed as a plate having at least one through-aperture for attaching a tail of the airbag unit; and
    a protrusion supported on the base and comprising a second material different from the first material, wherein the protrusion extends from the plate for insertion into a hole in the wall of the vehicle, and wherein insertion of the protrusion into the hole aligns the fastener aperture for attaching the fastener through the fastener aperture to the wall of the vehicle;
    wherein the base includes a tongue to be at least partially received within the protrusion, wherein the second material is moldable, and wherein the protrusion is molded onto the tongue.

2. The airbag bracket of claim 1, wherein the first material is a metallic material and the second material is a polymeric material.

3. The airbag bracket of claim 1, wherein the tongue is unitarily formed of the first material and projects into the through-aperture for attaching the tail of the airbag unit.

4. The airbag bracket of claim 1, wherein the base defines first and second through-apertures spaced apart from each other, the tongue extending from an edge of the first through-aperture.

5. The airbag bracket of claim 4, wherein the second through-aperture is longer in a width dimension than the first through-aperture.

6. The airbag bracket of claim 5, wherein the first through-aperture is positioned between the fastener aperture and the second through-aperture.

7. The airbag bracket of claim 1, wherein the protrusion includes a first segment with a first cross-section and a second segment with a second cross-section positioned between the base and the first segment, the first cross-section being different from the second cross-section in at least one of circumferential shape and perimeter dimension.

8. The airbag bracket of claim 1, wherein the protrusion includes on its outer surface two or more ribs spaced apart from each other.

9. The airbag bracket of claim 1, wherein the protrusion includes a transverse bar separating first and second cavities.

10. A vehicle airbag system mounted to a wall of a vehicle including an airbag unit and an airbag bracket, the airbag bracket comprising:
    a base including a fastener aperture to receive therethrough a fastener, wherein the base comprises a first material formed as a plate having at least one through-aperture for attaching a tail of the airbag unit; and
    a protrusion supported on the base and comprising a second material different from the first material, wherein the protrusion extends from the plate for insertion into a hole in the wall of the vehicle, and wherein insertion of the protrusion into the hole aligns the fastener aperture for attaching the fastener through the fastener aperture to the wall of the vehicle;
    wherein the base includes a tongue to be at least partially received within the protrusion, wherein the second material is moldable, and wherein the protrusion is molded onto the tongue.

11. The vehicle airbag system of claim 10, wherein the tail of the airbag unit connects to the protrusion.

12. The vehicle airbag system of claim 11, wherein the tail of the airbag unit includes an opening to receive therethrough the protrusion such that the tail of the airbag unit is between the base and an interior surface of a vehicle body portion in an assembled position.

13. An airbag bracket for mounting an airbag unit to a wall of a vehicle, comprising:
- a base including a fastener aperture to receive therethrough a fastener, wherein the base comprises a first material formed as a plate having at least one through-aperture for attaching a tail of the airbag unit; and
- a protrusion supported on the base and comprising a second material different from the first material, wherein the protrusion extends from the plate for insertion into a hole in the wall of the vehicle, and wherein insertion of the protrusion into the hole aligns the fastener aperture for attaching the fastener through the fastener aperture to the wall of the vehicle;
- wherein the base includes a tongue to be at least partially received within the protrusion, wherein the second material is moldable, and wherein the protrusion is molded onto the tongue; and
- wherein the base includes first and second stepped areas, the first stepped area being positioned between the fastener aperture and the second stepped area, and wherein at an assembled position, the second stepped area contacts the wall of the vehicle and the first stepped area is spaced apart from the wall of the vehicle.

* * * * *